United States Patent [19]

v. Deuren

[11] Patent Number: 4,669,966

[45] Date of Patent: Jun. 2, 1987

[54] PELLETIZING APPARATUS WITH MIXING BLADES FOR COMPACTING POWDERED AND FIBROUS RAW MATERIALS TO A PELLET PRODUCT

[75] Inventor: Francisccus A. M. v. Deuren, Gemonde, Netherlands

[73] Assignee: Norvidan Engineering Nederland B.V., Netherlands

[21] Appl. No.: 754,766

[22] Filed: Jul. 15, 1985

[30] Foreign Application Priority Data

Jan. 30, 1985 [NL] Netherlands ........................ 8500260

[51] Int. Cl.[4] ............................................. B29C 47/52

[52] U.S. Cl. .................................... 425/209; 366/313; 425/204; 425/331; 425/365; 425/374

[58] Field of Search ............... 425/331, 204, 209, 136, 425/365, 374; 366/279, 309, 312, 313, 325, 326, 329; 264/349

[56] References Cited

U.S. PATENT DOCUMENTS

| | | | |
|---|---|---|---|
| 3,427,639 | 2/1969 | Strauss | 425/136 |
| 3,601,371 | 8/1971 | Ross | 259/5 |
| 3,807,926 | 4/1974 | Morse | 425/331 |

*Primary Examiner*—Jan Silbaugh
*Assistant Examiner*—Jennifer Cabaniss
*Attorney, Agent, or Firm*—Basile, Weintraub & Hanlon

[57] ABSTRACT

Apparatus for compacting powdered and fibrous raw materials to a pellet product, comprising a mixing chamber with an inlet, a driven mixing shaft coaxially with respect to the mixing cylinder and which is provided with radially projecting blades. A pelletizer is connected directly to the mixing cylinder, and comprises a cylindrical mold coaxially inside a cylindrical jacket part and provided with radial holes, and inside which are arranged one or more freely rotatable pressure rollers as a result of which, when the apparatus is working, the compacted mixture is pressed through the holes, while the jacket part of the pelletizer is provided with an outlet for the compressed product. The mixing shaft is designed as a cylinder, rotatable coaxially with respect to a fixed supporting shaft. The blades carried by the hollow mixing cylinder each preferable consist of two plate parts which have a common edge extending in the direction of displacement of material in the mixing chamber and at either side are positioned at an angle to the direction of the shaft and the direction of rotation of the drive is reversible, so that the mixing chamber at the end adjoining the pelletizer is provided with a closable discharge opening, the materials mixed and compacted can be either pelletized or discharged before pelletizing.

9 Claims, 4 Drawing Figures

PELLETIZING APPARATUS WITH MIXING BLADES FOR COMPACTING POWDERED AND FIBROUS RAW MATERIALS TO A PELLET PRODUCT

DESCRIPTION OF THE PRIOR ART

The invention relates to an apparatus for compacting powdered and fibrous raw materials to a pellet product, comprising a mixing chamber, provided with an inlet for the raw materials and additives for processing, and if necessary an inlet for steam, a mixing shaft which is mounted essentially coaxially with respect to the mixing chamber and has a drive by means of which it can be set in rotation, and which is provided with blades which project essentially radially into the interior of the mixing chamber for mixing the raw materials and additives and compacting the mixture, and with a pelletizer being connected directly to the mixing chamber, the pelletizer comprising a cylindrical mold which is fixed coaxially inside an essentially cylindrical jacket part and is provided with radially directed holes, and inside which are arranged one or more pressure rollers, supported so as to revolve with the mixing shaft of the mixing chamber, in such a way that they roll over the inside wall of the mold, as a result of which, when the apparatus is working, the compacted mixture is pressed through the holes, while the jacket part of the pelletizer is provided with an outlet for the compressed product.

Such mixers with a directly connected pelletizer have a number of important advantages compared with the older apparatuses in which the mixture obtained in the mixing chamber was conveyed to a separate pelletizer. Apart from the fact that the combination takes up less space and is cheaper than the separate apparatuses, the main advantage of the combination lies in the fact that a totally enclosed system is produced. One of the fields of application is the production of animal feed pellets where the losses which occur, on the order of 1 to 1.5% of the added binding agents, lost in the form of vapor or steam, and through underpressure in a cooler connected downstream, are considerable.

For good and efficient operation of the pelletizer, it is very important that the mixture conveyed to the pelletizer is distributed as uniformly as possible over the pressure rollers present and also as uniformly as possible over the width of each pressure roller, i.e. over the width of the mold. Not only is the capacity of the pelletizer then fully utilized, a better quality of pressed product is also obtained, and uneven wear of the pressure rollers and the mold is prevented.

THE OBJECTS OF THE INVENTION

This invention aims at achieving a further improvement in the uniformity of distribution of the mixture in the pelletizer, and thus an improvement in the quality of the product.

CONCISE DESCRIPTION OF THE INVENTION

According to the invention, the mixing shaft is designed as a hollow cylinder which is arranged so as to be rotatable coaxially with respect to a fixed supporting shaft.

In this way, the essentially radially directed compression forces developed in the pelletizer are better absorbed, resulting in fewer deformations, so that, as a result, the pressure rolls and the inside wall of the mold do not undergo any deviations from the parallel shaft direction.

The invention is based on the idea that in prior machines, in which the mixing chamber was directly connected with the pelletizer, the common driving shaft had the disadvantage that the length of the shaft was so great that deformation could occur as a result of the forces arising from the compression. This is particularly a problem because the type of process requires that the pelletizer be fitted at the end of the shaft of the mixing chamber. Through the design of the mixing shaft as a hollow cylinder which is rotatable about a fixed supporting shaft, considerably greater rigidity against such deformation is obtained, with the above-mentioned beneficial result.

The design makes it possible to apply greater pressures, partly due to the mixing cylinder being designed in such a way that the mixing shaft has blades which extend to the inside wall of the mixing chamber, unlike the mixing apparatuses where the blades merely extend in the radial direction over part of the distance between the mixing shaft and the inside wall of the chamber.

For the same purpose, it is advantageous if the supporting elements for the pressure rollers are provided, at the side of the mixing chamber, with at least one scraper for each roller, said scrapers being at an angle to the direction of the shaft, and moving along the inside of the cylindrical jacket part of the pelletizer. These scrapers ensure great regularity in the infeed of the mixture at the area where the material is pressed by the pressure rollers through the perforations, under continuous thrusting force.

In a preferred embodiment the blades each consist of two plate parts which have a common edge oriented in the direction of displacement of material in the mixing chamber, each plate positioned at an angle to the direction of the shaft axis.

Such V-shaped blades, viewed in the radial direction, are designated so that the direction of movement of the mixture remains the same when the direction of rotation of the mixing shaft is reversed. This provides for the possibility of switching off the pelletizer and using the apparatus only as a mixing cylinder. When the direction of rotation is reversed, due to the presence of the scrapers provided at an angle, the material is no longer fed in, but is, on the contrary, removed from the mold. This prevents a small quantity of mixture from getting between the compression elements and thereby causing very high compression forces to be built up. The non-compressed mixture can be discharged through a closable outlet to the mixing cylinder at the end thereof adjoining the pelletizer.

BRIEF DESCRIPTION OF THE DRAWING

The invention will be explained below with reference to the attached drawing, where other object and features will become apparent by reference to the following specifications.

DESCRIPTION OF THE PREFERRED EMBODIMENT

A mixing chamber, indicated as a whole body 1, is provided with an inlet 2 for the raw materials and any additives to be processed. In the production of animal feed pellets, additives such as molasses and fat are generally used with vegetable raw materials. The infeed of raw materials can take place in a known manner (not illustrated) such as by means of an infeed screw. There can also be a connection (not illustrated) for the infeed of steam which serves to heat the mixture.

Figure 1:
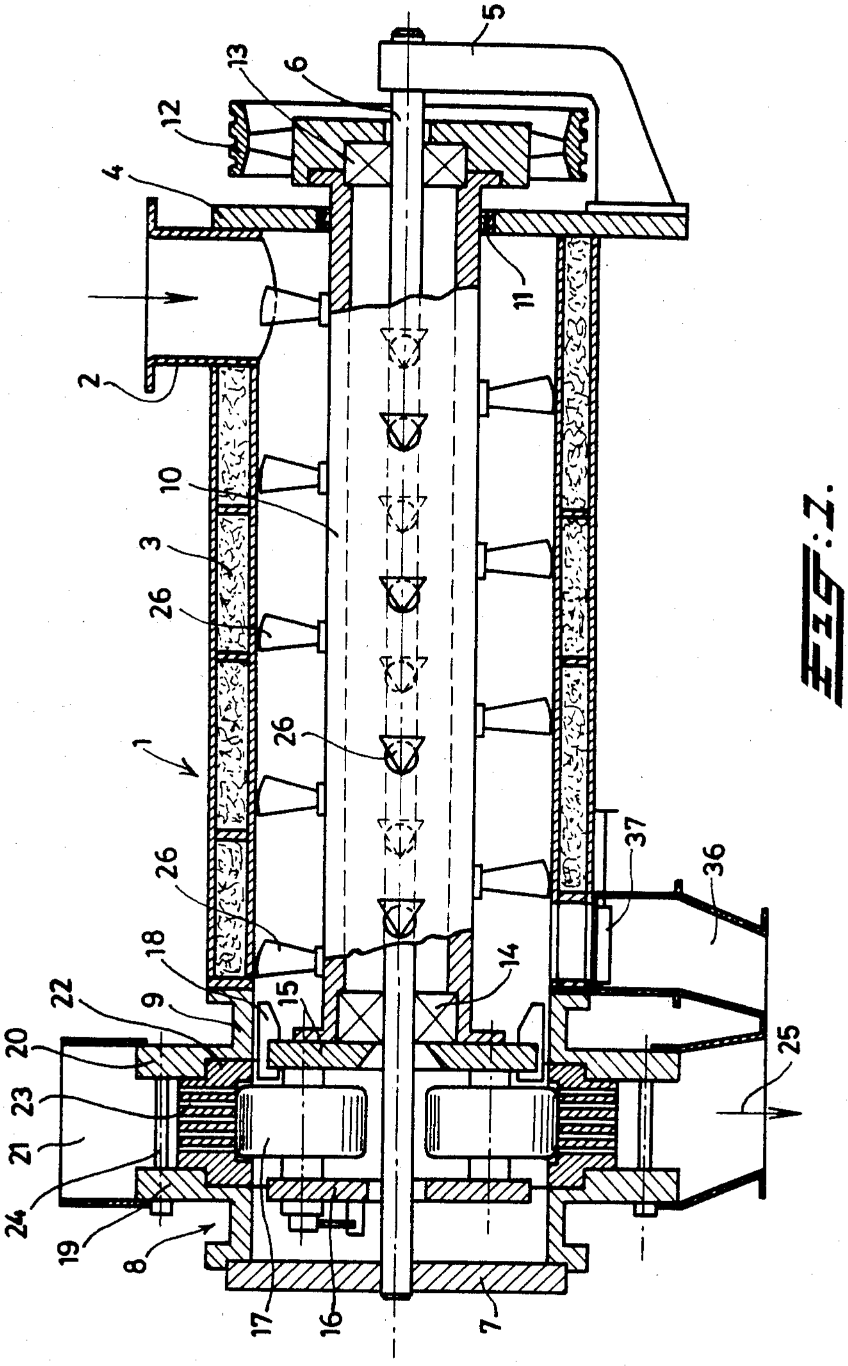
FIG. 1 is a schematic drawing of an axial cross section through the apparatus the form of a mixing cylinder with directly connected pelletizer.

It can be seen from FIG. 1 that the mixing chamber 1 is designed with double walls. As a result, great rigidity of the mixing chamber is obtained. The gap space 3 between the walls can, be used to fit insulation material to improve the heat economy of the apparatus.

The end of the mixing chamber 1 situated near the inlet 2 is shut off by an end plate 4. This plate 4 bears a supporting arm 5 for a stationary shaft 6, which is coaxial with respect to the chamber 1.

The other end of this stationary shaft 6 is carried by an end plate 7. The latter forms the end closure of the pelletizer (described below), which is indicated as a whole by 8, and whose jacket part 9 is internally cylindrical, coaxially arranged in relation to, and has the same diameter as the inside wall of the mixing chamber 1 to which this jacket part is fastened.

A mixing shaft 10 designed as a hollow cylinder is arranged coaxially inside the mixing chamber. It projects through an opening in the end plate 4, provided with a sliding gasket 11, so that a drive disc 12 can be attached to it, with the whole unit being rotatable on the stationary shaft 6 by means of a bearing 13.

At the end of the mixing chamber, near the pelletizer, the cylindrical mixing shaft 10 is supported rotatably on the stationary shaft 6 by a similar bearing 14.

The mixing cylinder 10 also carries a number of supporting elements such as 15 and 16, which comprise at least, essentially radially directed parts between which pressure rollers such as 17 are supported. These rollers are disposed so as to be freely rotatable with respect to their supporting elements. Each of the supporting elements 15 bears a scraper such as 18 at each roller 17. These scrapers are at an angle of, for example, 45° to the direction of the shaft and they scrape the inside of the pelletizer jacket 9.

Radially projecting from the jacket part 9 of the pelletizer 8 are two disc-shaped housing parts 19, 20, shut off by a peripheral housing 21, and between which disc-shaped parts the mold 22 is supported. This mold is provided with a large number of radial perforations 23, the perforated zone lying opposite the rollers 17.

The two disc-shaped housing parts 19, 20, are held together by a number of bolts 24. Outside the perforated pelletizer mold 23 a collection space is provided for the pressed product, which can be discharged through a discharge opening 25.

Figure 2:
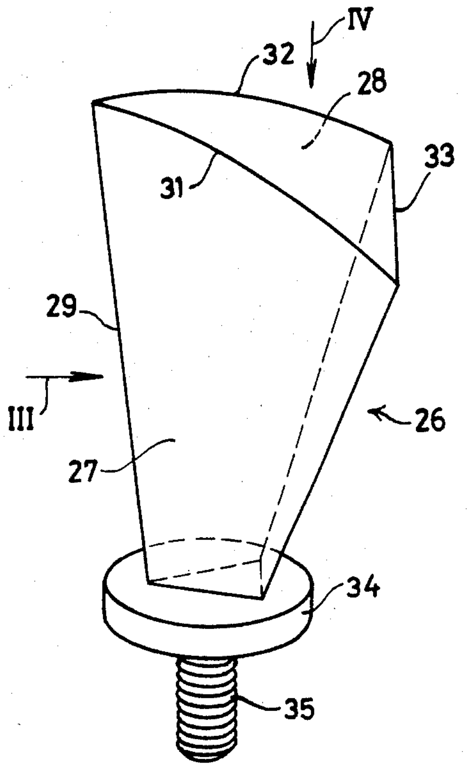
FIG. 2 is a perspective drawing of one of the blades.
Figure 3:
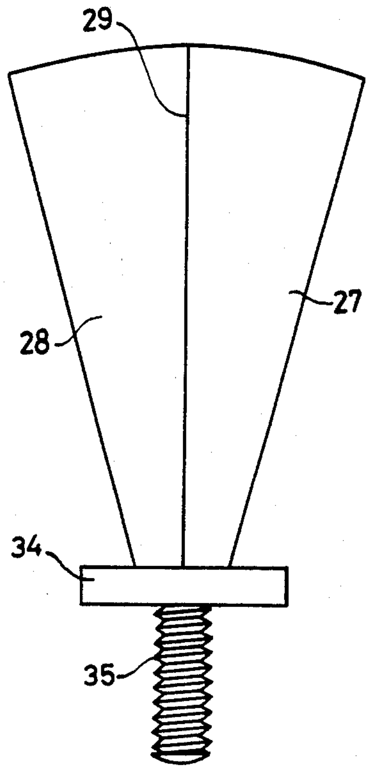
FIG. 3 is a view towards the front edge of the blade, according to the arrow III in FIG. 2.
Figure 4:
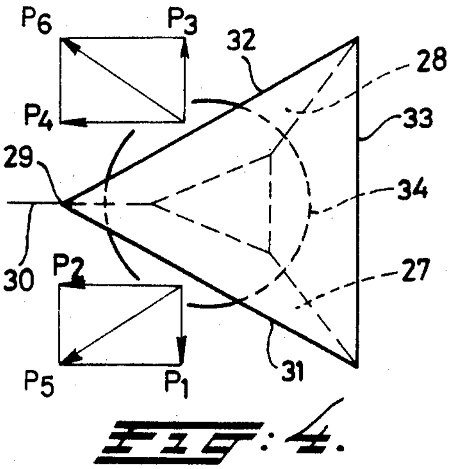
FIG. 4 is a view in the radial direction according to the arrow IV in FIG. 2.

The mixing shaft 10 carries a series of mixing blades 26, positioned along a helical line. One of these blades is shown separately in FIGS. 2 to 4. Each blade 26 consists of two plates 27, 28, which have a common edge 29 which is directed in the direction of conveyance, i.e. the direction from the material infeed 2 to the pelletizer. The common edge 29 in the embodiment illustrated is positioned somewhat sloping forward. As can be seen in particular from the top view of FIG. 4, the blade plates 27 and 28 are oriented at an angle of 45° with respect to the shaft direction 30. The top edges 31 and 32 of the plates have a curved outline which is adapted to fit the inside of the mixing chamber, so that the blades top edges 31, 32 extend with close tolerance to the inside wall of the mixing chamber. In this embodiment the dihedral angle formed by the plates 27 and 28 is closed off by an end plate 33. The whole blade 26 is placed on a bearing face 34, which is provided with a threaded end 35, by means of which the blade can be fixed in suitable threaded holes provided in the mixing shaft.

A blade designed in this way operates as follows. In one direction of rotation plate 27 exerts on the material lying in its direction of rotation, a force which is schematically indicated by the arrow $P_5$. As a result, a movement of the mass in the direction of the pelletizer takes place, indicated by the arrow $P_2$. The plate 28 on the other side exerts no force in the direction of positive movement of the mixture. Raw materials will be constantly supplied by the action of the other blades. If direction of rotation is reversed, the plate 28 becomes operational and will exert a force on the mixture mass which is schematically indicated by the arrow $P_6$, and as a result, a movement of the mixture, indicated by the arrow $P_4$, will take place in the direction of the pelletizer.

Thus, in both cases, movement of the mixture in the same direction takes place. The direction of rotation is reversed if the material is not to be passed through a pelletizer 8, but is to be discharged directly through the separate discharge opening 36, which is provided shortly before the pelletizer 8 in the mixing chamber, and which can be closed off by means of a slide 37. At the moment of reversal of the direction of rotation, the slanting scrapers 18 ensure emptying and unloading of the pelletizer 8.

The principle of the combined mixing apparatus and the pelletizer as described is usable for all applications of pelletizers. The production of animal feed pellets is indeed an important usage, but it is only one application from among a very large range.

Finally, it is pointed out that for the design of the apparatus it does not matter whether the combination is used as a precompacting apparatus, also called an intermediate press, where the product obtained may or may not be molded and then fed again to a pelletizer after molding, or the pellets obtained are the immediate final product. Also, this apparatus can be fed with the individual, unprocessed raw materials or with materials which have already undergone precompacting.

The apparatus as shown in FIG. 1 also guarantees good usability of the pressure rollers and the mold.

What is claimed is:

1. An apparatus for compacting powdered and fibrous raw materials to a pellet product comprising:
   a mixing chamber provided with an inlet for the raw materials and additives for processing; a stationary shaft extending coaxially through the mixing chamber; a mixing shaft mounted essentially coaxially with respect to the cylindrical mixing chamber, having blades which project essentially radially into the interior of the mixing chamber for mixing raw materials and compacting the mixture; means for rotationally driving the mixing shaft within the chamber; a pelletizer connected directly to the mixing chamber, the pelletizer comprising: an essentially cylindrical jacket part coaxially attached to the mixing chamber; a cylindrical mold having an inside wall and an outside wall fixed coaxially inside the jacket part having radially directed holes; at least one pressure roller located inside the cylindrical jacket part supported so as to revolve freely with respect to the stationary shaft of the mixing chamber, the pressure roller rotating together with the mixing shaft such that the pressure roller rolls over the inside wall of the mold such that the compacted mixture is pressed through the holes; an outlet for the compressed product located on the jacket part; wherein the mixing shaft is a hollow cylinder which is arranged so as to revolve coaxially with respect to the stationary shaft.

2. The apparatus of claim 1, wherein the mixing shaft has a plurality of blades attached thereto, the blades extending to the inside wall of the mixing chamber.

3. Apparatus for compacting powdered and fibrous raw materials to a pellet product comprising: a cylindrical mixing chamber, provided with an inlet for the raw materials and additives for processing; a stationary shaft extending coaxially through the mixing chamber; a mixing shaft mounted essentially coaxially with respect to the mixing chamber, the stationary shaft extending coaxially therethrough; the mixing shaft having blades which project essentially radially outward from the shaft into the interior of the mixing chamber for mixing the raw materials and additives and compacting the mixture; means for rotationally driving the mixing shaft; a pelletizer connected directly to the mixing chamber, said pelletizer comprising: a cylindrical mold; an essentially cylindrical jacket part, the cylindrical mold fixed coaxially therein, the cylindrical mold having a plurality of radially directed holes; at least one pressure roller located within the cylindrical mold, the pressure roller supported so as to revolve freely with respect to the stationary shaft of the mixing chamber, and rotating together with said mixing shaft, in such a way that the pressure roler rolls over the inside wall of the mold such that the compacted mixture is pressed through the holes; the jacket part of the pelletizer having an outlet for the compressed product; supporting elements for the pressure roller provided at the side of the mixing chamber; at least one scraper for each roller, said scrapers being at an angle to the axis of the shaft and moving along the inside of the cylindrical jacket part of the pelletizer; and wherein the mixing shaft is a hollow cylinder which is arranged so as to revolve coaxially with respect to a fixed supporting shaft.

4. The apparatus of claim 3, wherein each blade consists of two plate parts having a common edge oriented in the direction of displacement of material in the mixing chamber, each plate positioned on either side of the common edge at an angle to the direction of the shaft axis.

5. The apparatus of claim 3, wherein each blade consists of two plate parts having a common edge oriented in the direction of displacement of material in the mixing chamber, each plate positioned on either side of the common edge at an angle to the direction of the shaft axis and wherein the common edge slopes forward at a slight angle in the direction of material displacement.

6. The apparatus of claim 3, wherein each blade consists of two plate parts, having a common edge oriented in the direction of displacement of material in the mixing chamber, each plate positioned on either side of the common edge at an angle to the direction of the shaft axis wherein the common edge slopes forward at a slight angle in the direction of material displacement and wherein the dihedral angle formed by the two plate parts is closed off by an end plate.

7. The apparatus of claim 3, wherein each blade consists of two plate parts, which have a common edge oriented in the direction of displacement of material in the mixing chamber, each plate positioned on either side of the common edge at an angle to the direction of the shaft axis and wherein the top edges of the plate parts of the blades have a curved outline extending with close tolerance to the inside wall of the mixing chamber.

8. The apparatus of claim 3, wherein each blade consists of two plate parts, which have a common edge oriented in the direction of displacement of material in the mixing chamber, each plate positioned on either side of the common edge at an angle to the direction of the shaft axis and wherein the direction of rotation of the drive means is reversible and the mixing chamber at the end adjoining the pelletizer is provided with a closable discharge opening for the mixture.

9. An apparatus for compacting powdered and fibrous raw materials to a pellet product comprising: a double walled, insulated mixing chamber; having an inlet for the raw materials and additives for processing; a stationary supporting shaft extending coaxially through the mixing chamber; a mixing shaft mounted essentially coaxially with respect to the mixing chamber, the mixing shaft having blades which project essentially radially outward from the shaft into the space of the mixing chamber for mixing the raw materials and additives and compacting the mixture; means for rotationally driving the mixing shaft and a pelletizer connected directly to the mixing chamber, said pelletizer comprising: an essentially cylindrical jacket part attached to the mixing chamber; a cylindrical mold fixed coaxially inside the cylindrical jacket part, the cylindrical mold having radially directed holes; at least one pressure roller located within the cylindrical mold, the pressure roller supported so as to revolved freely with respect to the stationary shaft of the mixing chamber, and rotating together with said mixing shaft in such a way that the roller rolls over the inside wall of the mold such that the compacted mixture is pressed through the holes, the jacket part of the pelletizer having an outlet for the compressed product; wherein the mixing shaft is a cylinder arranged so as to revolve coaxially with respect to the stationary supporting shaft.

* * * * *